March 29, 1966 H. STUT 3,243,509
APPARATUS FOR MEASURING THE MOLTEN ZONE DIAMETER
IN ZONE-MELTING PROCESSES
Filed April 26, 1963
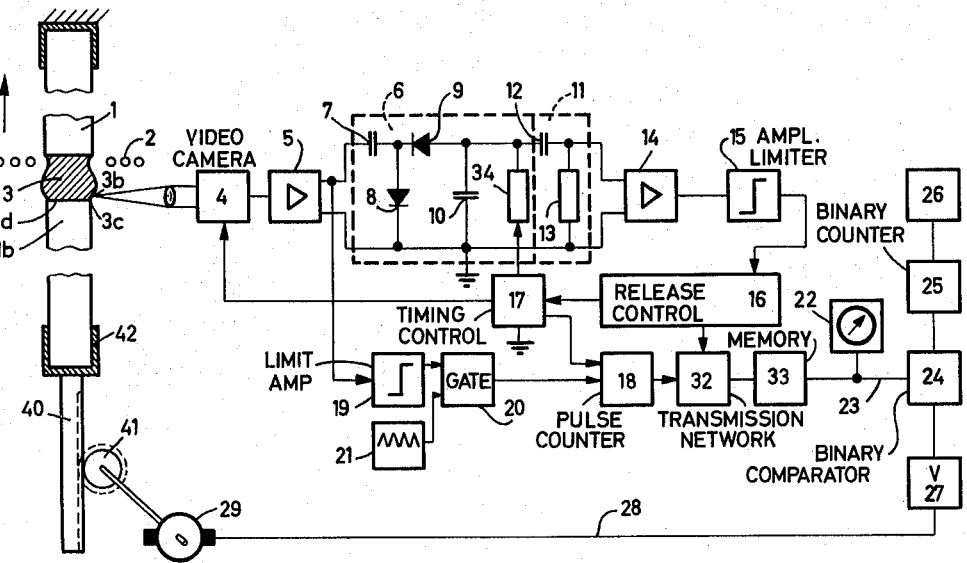
Fig.1
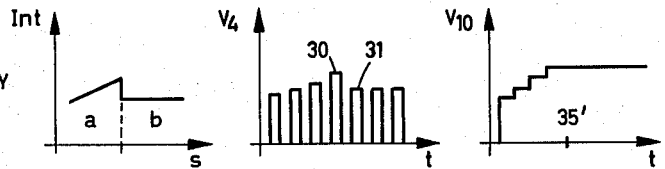
Fig.2  Fig.3  Fig.4
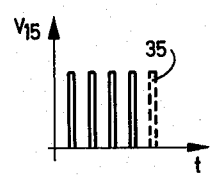 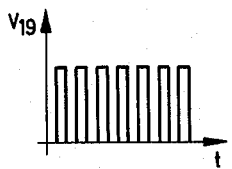 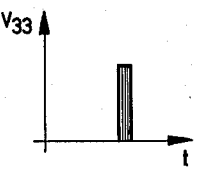
Fig.5  Fig.6  Fig.7 ively conditions at various locations in FIG. 1.

United States Patent Office 3,243,509
Patented Mar. 29, 1966

3,243,509
APPARATUS FOR MEASURING THE MOLTEN ZONE DIAMETER IN ZONE-MELTING PROCESSES
Hans Stut, Lochham, near Munich, Germany, assignor to Siemens-Schuckertwerke Aktiengesellschaft, Berlin-Siemensstadt and Erlangen, Germany, a corporation of Germany
Filed Apr. 26, 1963, Ser. No. 277,665
Claims priority, application Germany, Apr. 27, 1962, S 79,197
10 Claims. (Cl. 178—6)

My invention relates to zone melting and particularly to an apparatus for determining the diameter of the molten zone being passed along the length of a semiconductor rod.

Zone melting may be used to produce a monocrystalline body out of the polycrystalline rod so as to purify it, to even the doping level along the entire length of the rod or for other purposes. The shape of the molten zone depends upon the heating intensity which a suitable source of heat, preferably an inductive heating device, applies to the semiconductor rod. Heating of the molten zone may be accomplished by a heating coil passing upwardly along the axial direction of the rod. It must be such that the molten zone, whose height and bulge near the solidifying zone, partially determined by the surface tension of the molten material, will possess a certain minimum mechanical stability. Also, it must be such that the rod will always retain a desired predetermined diameter in its solidifying zone. This latter effect provides the semiconductor rod with a smooth surface while at the same time ensuring an even and uniform distribution of the electric doping substances.

It is an object of this invention to provide means to determine precisely for each longitudinal position of the rod the diameter in the molten zone, preferably the diameter prevailing between the solid and the liquid phases, namely between the molten zone and its solidifying portion.

The present invention is based upon the recognition that identifying the phase boundary between the solid and the liquid phases is a sudden variation in the radiation intensity of the semiconductor rod or of a simulated image thereof.

Thus according to a feature of my invention, I repeatedly scan the rod or a simulated image thereof transverse to the rod axis with sensing means having a beam, progressing with the scans across the phase boundary between the solid and liquid phases so as to obtain a plurality of diameter and intensity indications. I then measure the relative intensities of the images obtained by the scans to detect a sudden change of intensity between indications to select thereby the particular scan crossing the phase boundary, and I measure the length of time necessary to scan completely across the rod at the phase boundary as indicative of its diameter.

According to another feature of my invention, I use a television camera tube comprising a multiple-photocell system, preferably of the Vidikon type, to obtain an image of the semiconductor rod at the phase boundary between the solid and the liquid phases, i.e., the solidifying portion of the molten zone of the semiconductor rod as well as the portions adjacent thereto. I pass the sensing beam over the image of the rod in the transverse direction thereof, i.e., in a direction perpendicular to the rod axis. The period of time which it takes for the beam to pass over the image of the semiconductor rod in the direction defining the width of said rod, and across the photocell system determines each given diameter value, by metering or counting the pulses which are supplied during said period of time by a constant-frequency voltage source. I use the line-type sensing or scanning process, particularly scanning of the rod image in the photocell system, only for that part of the scanning operation which occurs as the sensing or scanning beam passes the phase boundary between the solid and the liquid phases as represented in the image of the semiconductor rod, or as it passes the portions immediately adjacent thereto. This then provides for a well-defined measurement for the relevant diameter of the semiconductor rod which is to undergo a zone-melting process.

According to another feature of my invention I employ the diameter measuring result obtained by means of the above-described device to control automatically the zone-melting process in step with a predetermined program or preset value pattern. For this purpose I compare the value detected by the measuring device with a suitable desired predetermined reference magnitude or with corresponding program magnitudes in a coincidence circuit, and I use the thus determined differential value or deviation from the desired predetermined value as a control magnitude in control means, for stretching the semiconductor rod if the measured diameter exceeds the predetermined desired value, or for compressing the rod whenever the measured diameter is smaller than said predetermined desired value, by adjusting the clamped ends of the semiconductor rod relative to each other.

Other objects and advantages of the present invention as well as the structure by virtue of which they are obtained will become evident from the following detailed description of an apparatus embodying features of the invention when read in light of the accompanying drawing wherein:

FIG. 1 is a partially schematic and partially block diagram of a zone-melting rod-diameter measuring system embodying features of the invention;

FIG. 2 is an intensity-distance diagram of the radiation intensity along the rod in FIG. 1; and FIGS. 3 to 7 are voltage time diagrams illustrating conditions at various locations in FIG. 1.

In FIG. 1, a semiconductor rod 1 which is to undergo the zone-melting process, is surrounded by a heating coil 2 forming a molten zone 3. The heating coil 2 passes along the semiconductor rod in the upward direction as indicated by the arrow, in order to effect zone melting. Accordingly, the solidifying front of the molten zone is located adjacent the lower boundary 3c of the molten zone. An image showing the range of transition from the molten zone 3 to the lower portion 1b of the semiconductor rod 1 is reproduced by means of a TV-camera 4 upon its photocell system. FIG. 2 shows the radiation intensity relative to distance along the rod in this area. An electron beam scans the image thus obtained in the multiple photocell system to produce signals corresponding to the image configuration at the output of the camera and shown by voltage $V_4$ in FIG. 3. An amplifier 5 feeds these signal values to peak rectifier means 6, comprising an input capacitor 7, a shunt rectifier 8, a serially connected rectifier 9, and an output capacitor 10. The output value ($V_{10}$, in FIG. 4) supplied by the peak rectifier is differentiated by means of a device 11, comprising a capacitor 12 and a shunt resistance 13, and fed to an amplifier 14. An amplitude limiting device 15 (having an output $V_{15}$ in FIG. 5) clips the output magnitude supplied by the amplifier 14 and feeds it to releasing or tripping means 16. Timing means 17 control the time meter, initiates each scanning operation within the TV-camera 4 and moreover presets the counting device or meter 18 and the tripping device 16.

The counting device or pulse counter 18 is preset so as to measure the width or diameter of the rod for each line scanned by counting the number of pulses supplied during the period of time determined by the diameter length in the image of the semiconductor rod in the camera 4. A constant high-frequency voltage source 21 supplies pulses to counter 18 via gate control means 20 as soon as the output voltage of the amplifier 5 opens the gate 20 via the amplitude-limiting device 19 which has the output voltage $V_{19}$ of FIG. 6. Timing means 17 presets the tripping device 16 so as to release the transmission of the critical line across the phase boundary as scanned on the image defined in the camera. Then the critical line signal is transmitted from the counter 18 through the transmission system 32 and to the memory storage system 33 (see $V_{33}$ in FIG. 7). Moreover, the timing means 17, via the resistance 34 at the output of the peak rectifier 6 discharge the capacitor 10 prior to the commencement of each new image-scanning operation. However transmission of time pulses from the counter 18 via the releasing or tripping device 16 may be effected only after tripping device 16 stops receiving signals from the output of the amplitude-limiting device 15. The output value as supplied by the memory storage system 33 is then evaluated by a diameter-indicating device 22.

The output value also passes along line 23 to a binary comparator or difference calculator 24, constructed to extract the difference value and its polarity between two binary coded values so as to compare the difference between the measured value at the output of memory 33 and the desired reference value at a binary counter 25. The latter has set therein, by a pulse transmitter in a programming apparatus 26, the reference value corresponding to the desired rod diameter. The differential magnitude obtained in 24, a digital-analog converter, is supplied to 27, which responds as well to the polarity so as to produce a positive or negative voltage corresponding in magnitude to the difference. A line 28 passes the latter polarized value to control a polarity sensitive motor 29 driving a rack 40 by a spur gear 41. The lower clamping end 42 of the rod 1 is secured to the rack 40 and is moved up or down to compress or stretch the melted zone to change the diameter at the solidifying front to the desired value.

The transition between the solid and the liquid phases which takes place at the solidifying front $3c$ of the semiconductor rod, produces an the multiple photocell camera system 4 an image with marked change in radiation intensity from the solid portion $1b$ of the rod in the zone $1d$ thereof, to the molten zone in the range $3b$. This is more clearly illustrated in FIG. 2, wherein the travel distance $s$ is plotted against the abscissa and the radiation intensity Int is plotted against the ordinate. The range $a$ in FIG. 2 defines a zone portion $1d$ adjacent the phase boundary $3c$ in the solid portion of the rod, whereas the range $b$ defines a portion $3b$ of the already molten zone 3 adjacent the phase boundary $3c$. A sudden sharp drop in the radiation intensity of the heated rod occurs at the point of transition between the zones $a$ and $b$ of FIG. 2, that is between the zones $1d$ and $3b$ of the rod 1, respectively. According to the present invention it is this drop which is detected and evaluated by scanning of the rod image in the camera.

In FIG. 3 the practically rectangular output voltage pulses 30 of the camera 4 as they are obtained during scanning of the semiconductor rod image transverse to the rod axis, are plotted against the time $t$. Each successive scanning line gets closer to the phase boundary $3c$ which is eventually passed. The closer each scanning line is located to the phase boundary $3c$, the higher is the rod temperature detected by such scanning action, and consequently the higher is the amplitude of the voltage pulse at the output of the TV-camera 4 as shown in FIG. 3. The first scanning line to be located partly or entirely within the image of the molten zone, because of the sudden change in the radiation intensity of the semiconductor rod, such as illustrated in FIG. 2, becomes noticeable insofar as the radiation intensity suddenly drops and decreases. The voltage pulse 31 generated by virtue of the scanning action of this specific line has a lower amplitude value than the immediately preceding amplitude of the pulses 30. The voltage pulses following subsequent to the pulse 31 are practically all of the same height because the radiation intensity of the molten zone to follow may, for all practical purposes, be considered as being constant. However, these pulses are not utilized for the purposes of the present invention. As soon as the output pulse 31 having the lower amplitude is supplied at the output of the TV-camera 4, this output pulse will, via the above-described system consisting of the component elements 5, 6, 11, 14 and 15, release the tripping circuit 16, whereafter the value determined by the meter 18 is transmitted via 32 to the memory storage system 33.

While FIG. 3 illustrates the timed sequence or time intervals and the amplitude of those voltage pulses which are available at the output of the TV camera, the graph of FIG. 4 shows the voltage characteristic at the output capacitor 10 of the peak rectifier means 6. The component circuit elements of said peak rectifier means have a small charging time constant and a significantly higher discharge time constant. This charging of the capacitor 10 is accomplished within a relatively short period of time, whereas its discharge takes a relatively long period of time. The voltage characteristic as illustrated in FIG. 4 therefore goes up in distinct steps as determined by the steadily increasing temperature prevailing in the solid portion of the zone $1d$ of the semiconductor rod, until the first line is reached which stands for and covers the diameter of the molten zone across the transition $3c$, or which follows immediately thereafter. As soon as this line is reached, the voltage will not increase any further, as also indicated in FIG. 4, i.e., the voltage characteristic continues on a horizontal line or, as determined by the long discharge time constant, along a very slightly declining line. If the stepwise increases are differentiated through a series-connection 12, 13 and after suitable amplification and amplitude-limitation through 15, the voltage pulses plotted against the time illustrated in FIG. 5 are obtained.

In FIG. 5 a voltage pulse 35 which would be the first voltage pulse obtained by scanning of the first line in the molten zone range has been indicated in broken lines. This pulse does not occur, as the corresponding increase step which would have to be located at the time value 35' in FIG. 4 is compeltely non-existent in the voltage characteristic of FIG. 4, and a corresponding differentiation at this point does therefore not result in a voltage pulse. The omission of the pulse 35 in FIG. 5 is utilized in the circuit shown in FIG. 1 to control the releasing or tripping device 16 in such a manner as to permit the pulses counted by 18 to pass through transmission network 32 and to the memory storage system 33.

FIG. 6 is another graph wherein the voltage pulses obtained at the output of the limiting device 19 or ahead of the gate 20 are plotted against the time. The width of each of these voltage pulses is proportional to the diameter of the rod for each given line as scanned in the image which is reproduced in the TV camera.

The graph of FIG. 7 shows the pulses of the frequency of the voltage source 21; the total duration of all of these pulses corresponds to the diameter value of the rod prevailing at the boundary between the solid and the liquid phases or at the beginning of the molten zone, respectively, and thereby constitutes a measurement for the diameter of the rod; the so determined magnitude is transmitted by the memory storage system either to the diameter indicator 22, to the comparison unit 24 which serves to compare the actual and the predetermined desired magnitudes with each other, or both.

Fundamentally, the present invention thus provides for the scanning beam to be passed across the image taken by the TV camera and across the phase boundary between the solid and the liquid phases of the rod which is being subjected to a zone-melting process. As the sensing beam, in the image of the solid rod portion, approaches the image portion representing the solidifying portion of the molten zone, the radiation intensity of the semiconductor body noticeably increases until it reaches a point where a sudden decrease in the intensity of the semiconductor rod radiation is registered in the image thereof. Such a decrease is due to the physical phenomenon prevailing at the point of transition of the phase boundary between the solid and the liquid phases. This sudden decrease is particularly apparent in the first scanning line being passed across the molten zone directly adjacent the solidifying zone. After the solidifying zone has been passed, the TV camera will register approximately constant values for the radiation intensity at the rod image of the molten zone across the further portion thereof which is being scanned. Even though the diameter value as then detected, differs as a result of the known spatial or surface configuration of the molten zone, this is no longer of any interest or relevance for the method of the present invention, and these values are not evaluated.

The radiation intensity magnitude measured at the point of transition from the solid to the liquid molten zone phase at the solidifying zone thereof now serves to actuate counting means in a metering device, which counts the number of pulses supplied by a constant-frequency voltage source for the period of time during which the diameter of the rod image is being scanned.

The magnitude thus measured may now be used either purely as a signalling value for the operator to allow him to control the device to the desired constant or varying diameter, or for the purpose of regulating suitable control means. Varying the diameter may be desirable, for instance, in a case where, in a semiconductor rod, the transition from the diameter of the seed crystal is to be controlled to conform to the diameter of the semiconductor rod proper which is to be transformed into the monocrystalline state.

The difference calculator 24 extracts the difference value and its sign (or polarity) between the binary coded values thereby producing an analog value whose polarity and magnitude correspond to the sign and magnitude of the measured difference.

According to the invention, the diameter of a semiconductor rod at the transition between the liquid and solid regions, particularly, at the re-solidified region, during zone melting is measured by means of a device which furnishes from this particular portion of the semiconductor rod an optical image and which scans this image, for example, inside the TV camera, with the aid of rays passing at a given speed over the image in a direction transverse to the axis of the rod image; and the time required by such a travelling ray from the moment where it reaches one side of the image until it leaves the image on the opposite side, is taken as a measure of the diameter. At the boundary where the liquid ray region merges with the solid region, there obtains in both regions virtually the same temperature, but the solid region irradiates with a considerably higher intensity than the liquid region. Consequently, when the scanning takes place in a rapid sequence along respective traces slightly displaced from each other in the axial direction of the rod, then the before-mentioned differences in brightness of the rod or image readily afford determining the particular scan that takes place just along the transition zone. Consequently, in this manner an exact measuring value for the width of the rod is obtained with respect to the location where it has again converted from liquid to solid condition. The reaction caused by the change in brightness upon the scanning ray is employed for controlling an electric current to impart to the current an approximately rectangular curve shape. The width of such a rectangle then constitutes a measure of the diameter at the particular locality being scanned, and hence preferably at the re-solidifying front. With the aid of means sensitive to difference in radiation intensity the issuance of output signals is limited exclusively to this mainly interesting range in which the liquid zone borders the re-solidified material.

For determining the length of time, i.e., the width of the rectangle, there are pulses furnished from a voltage source of constant frequency. By counting the number of pulses issuing during scanning of the image, a measure of the rod width being scanned is thus obtained.

A particularly simple apparatus results when producing the image with the aid of a device that comprises a television camera. With the aid of the video camera, the intensity differences are converted into electric signals in the output circuit of the camera.

While an embodiment of the invention has been described in detail it will be obvious to those skilled in the art that the invention may be practiced otherwise.

I claim:

1. For semiconductor-rod zone-melting, a device for measuring the diameter of the molten zone adjacent the solidifying front at the phase boundary between the solid and liquid phases, said device comprising intensity responsive television camera means for scanning across the width of the rod the solidifying front adjacent the molten zone at the phase boundary transition from solid to liquid phase, circuit means connected to said camera means responding to a sudden difference in radiation intensity between the individual scans across the rod to select the scan across the phase boundary, and measuring means for determining the length of time during the selected scan immediately after the instant of the sudden difference in radiation intensity that the image of the rod is detected, said length of time being a measure of the desired rod diameter.

2. For semiconductor-rod zone-melting, a device for measuring the diameter of the molten zone adjacent the solidifying front at the phase boundary between the solid and liquid phases, said device comprising intensity responsive television camera means for scanning across the width of the rod the solidifying front adjacent the molten zone at the phase boundary transition from solid to liquid phase, circuit means connected to said camera means responding to a sudden difference in radiation intensity between the individual scans across the rod to select the scan across the phase boundary, measuring means for determining the length of time during the selected scan immediately after the instant of the sudden difference in radiation intensity that the image of the rod is detected, said length of time being a measure of the desired rod diameter, and memory storage means for storing the measured magnitude.

3. For semiconductor-rod zone-melting, a device for measuring the diameter of the molten zone adjacent the solidifying front at the phase boundary between the solid and liquid phases, said device comprising intensity responsive television camera means for scanning across the width of the rod the solidifying front adjacent the molten zone at the phase boundary transition from solid to liquid phase, circuit means connected to said camera means responding to a sudden difference in radiation intensity between the individual scans across the rod to select the scan across the phase boundary, measuring means for determining the length of time during the selected scan immediately after the instant of the sudden difference in radiation intensity that the image of the rod is detected, said length of time being a measure of the desired rod diameter, memory storage means for storing the measured magnitude, and indicator means connected to said memory storage means for indicating the measured value.

4. For semiconductor-rod zone-melting, a device for measuring the diameter of the molten zone adjacent the solidifying front at the phase boundary between the solid and liquid phases, said device comprising intensity responsive television camera means for scanning across the width of the rod the solidifying front adjacent the molten zone at the phase boundary transition from solid to liquid phase, circuit means connected to said camera means responding to a sudden difference in radiation intensity between the individual scans across the rod to select the scan across the phase boundary, and measuring means for determining the length of time during the selected scan immediately after the instant of the sudden difference in radiation intensity that the image of the rod is detected, said length of time being a measure of the desired rod diameter, said measuring means including a meter, high-frequency voltage source means, and gate means connected to said measuring means for passing pulses from said source means to said meter.

5. For semiconductor-rod zone-melting, a device for measuring the diameter of the molten zone adjacent the solidifying front at the phase boundary between the solid and liquid phases, said device comprising intensity responsive television camera means for scanning across the width of the rod the solidifying front adjacent the molten zone at the phase boundary transition from solid to liquid phase, circuit means connected to said camera means responding to a sudden difference in radiation intensity between the individual scans across the rod to select the scan across the phase boundary, and measuring means for determining the length of time during the selected scan immediately after the instant of the sudden difference in radiation intensity that the image of the rod is detected, said length of time being a measure of the desired rod diameter; said circuit means including pulse peak storage means for producing a stepped voltage from the pulsed output of the camera means representing the rod image during the individual scans and differentiating means for differentiating the stepped voltage into individual pulses for each step.

6. For semiconductor-rod zone-melting, a device for measuring the diameter of the molten zone adjacent the solidifying front at the phase boundary between the solid and liquid phases, said device comprising intensity responsive television camera means for scanning across the width of the rod the solidifying front adjacent the molten zone at the phase boundary transition from solid to liquid phase, circuit means connected to said camera means responding to a sudden difference in radiation intensity between the individual scans across the rod to select the scan across the phase boundary, and measuring means for determining the length of time during the selected scan immediately after the instant of the sudden difference in radiation intensity that the image of the rod is detected, said length of time being a measure of the desired rod diameter, said circuit means including pulse peak storage means for producing a stepped voltage from the pulsed output of the camera means representing the rod image during the individual scans, differentiating means for differentiating the stepped voltage into individual pulses for each step and gate means responding to cessation of the pulses and having an input connected to said camera means for emitting the pulse corresponding to the scan of the rod at the desired diameter.

7. For semiconductor-rod zone-melting, a device for measuring the diameter of the molten zone adjacent the solidifying front at the phase boundary between the solid and liquid phases, said device comprising intensity responsive television camera means for scanning across the width of the rod the solidifying front adjacent the molten zone at the phase boundary transition from solid to liquid phase, circuit means connected to said camera means responding to a sudden difference in radiation intensity between the individual scans across the rod to select the scan across the phase boundary, and measuring means for determining the length of time during the selected scan immediately after the instant of the sudden difference in radiation intensity that the image of the rod is detected, said length of time being a measure of the desired rod diameter, said circuit means including pulse peak storage means for producing a stepped voltage from the pulsed output of the camera means representing the rod image during the individual scans, differentiating means for differentiating the stepped voltage into individual pulses for each step and gate means responding to cessation of the pulses and having an input connected to said camera means for emitting the pulse corresponding to the scan of the rod at the desired diameter, said pulse peak storage means having a capacitor and time constants to charge the capacitor rapidly and discharge it slowly.

8. For semiconductor-rod zone-melting, a device for measuring the diameter of the molten zone adjacent the solidifying front at the phase boundary between the solid and liquid phases, said device comprising intensity responsive television camera means for scanning across the width of the rod the solidifying front adjacent the molten zone at the phase boundary transition from solid to liquid phase, circuit means connected to said camera means responding to a sudden difference in radiation intensity between the individual scans across the rod to select the scan across the phase boundary, and measuring means for determining the length of time during the selected scan immediately after the instant of the sudden difference in radiation intensity that the image of the rod is detected, said length of time being a measure of the desired rod diameter, said measuring means including a meter, high-frequency voltage source means and gate means connected to said measuring means for passing pulses from said source means to said meter, said circuit means including pulse peak storage means for producing a stepped voltage from the pulsed output of the camera means representing the rod image during the individual scans, differentiating means for differentiating the stepped voltage into individual pulses for each step and gate means responding to cessation of the pulses and having an input connected to said camera means for emitting the pulse corresponding to the scan of the rod at the desired diameter, said pulse peak storage means having a capacitor and time constants to charge the capacitor rapidly and discharge it slowly.

9. A zone-melting apparatus, comprising support means for holding a semiconductor rod at each end, movable coil means for melting a zone in the rod and moving the molten zone along the rod, intensity responsive television camera means for scanning across the width of the rod the solidifying front adjacent the molten zone at the phase boundary transition from solid to liquid phase, circuit means connected to said camera means responding to a sudden difference in radiation intensity between the individual scans across the rod to select the scan across the phase boundary, measuring means for determining the length of time during the selected scan immediately after the instant of the sudden difference in radiation intensity that the image of the rod is detected, said length of time being a measure of the desired rod diameter, memory storage means for storing the measured magnitude, and control means responsive to said memory storage means and connected to said support means for moving the ends of said rod toward and away from each other according to the measurement.

10. For semiconductor-rod zone-melting, a device for measuring the diameter of the molten zone adjacent the solidifying front at the phase boundary between the solid and liquid phases, said device comprising camera means for producing an image of said rod, scanning means for scanning across the width of the image of the rod at the solidifying front adjacent the molten zone at the phase boundary transition from solid to liquid phase, circuit means connected to said camera means responding to a sudden difference in radiation intensity between the individual scans across the rod image to select the scan across the phase boundary, and measuring means for determining the length of time during the selected scan immediately after the instant of the sudden difference in radiation intensity that the image of the rod is detected, said length of time being a measure of the desired rod diameter.

References Cited by the Examiner

UNITED STATES PATENTS

| | | | |
|---|---|---|---|
| 2,674,915 | 4/1954 | Anderson | 178—6 |
| 2,898,429 | 8/1959 | Emeis et al. | 219—10.43 |
| 3,021,386 | 2/1962 | Clark | 178—6 |

DAVID G. REDINBAUGH, *Primary Examiner.*

R. RICHARDSON, *Assistant Examiner.*